(Model.) 2 Sheets—Sheet 1.

N. O. BOND.
Wash Stand.

No. 237,723. Patented Feb. 15, 1881.

Witnesses. Inventor.
M. J. Curtis N. O. Bond.
No. M. Gold F. Curtis, Att'y.

(Model.) 2 Sheets—Sheet 2.

N. O. BOND.
Wash Stand.

No. 237,723. Patented Feb. 15, 1881.

Witnesses,
M. J. Curtis
M. M. Gold.

Inventor,
N. O. Bond.
F. Curtis. Atty.

N. PETERS, PHOTO-LITHOGRAPHER, WASHINGTON, D. C.

UNITED STATES PATENT OFFICE.

NATHAN O. BOND, OF FAIRFAX COURT-HOUSE, VIRGINIA.

WASH-STAND.

SPECIFICATION forming part of Letters Patent No. 237,723, dated February 15, 1881.

Application filed December 24, 1880. (Model.)

*To all whom it may concern:*

Be it known that I, NATHAN O. BOND, a citizen of the United States, residing at Fairfax Court-House, in the county of Fairfax and State of Virginia, have invented certain new and useful Improvements in Wash-Stands; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The purpose of this invention is to avoid the inconvenience attending the use of the ordinary bowl, pitcher, and slop-jar of a wash-stand, by providing means for enabling a stationary set bowl to be readily supplied with clean water and emptied of its contents after use without recourse to a pitcher to supply it, or a handling of the bowl to empty it; and it consists, first, in the employment, with a suitable case or cabinet containing a stationary bowl, of a tank or vessel for containing a supply of fresh water, adapted to be exposed to a sufficient extent to enable the water to be supplied to it, and connected with the bowl by a flexible connection which permits of this— a pump being combined with the tank and operated from the outside of the cabinet, to force the water from the tank to the bowl through the said elastic connection; second, in a waste-water vessel or receiver to receive the contents of the bowl after use, and a flexible pipe connected with the outlet of such bowl and leading to said receiver, and combined with a means of compressing and choking it, to prevent escape of the contents of the bowl until the proper time, the compressing device being operated by a knob at the front of the cabinet, and the whole being as hereinafter explained.

Figure 1:
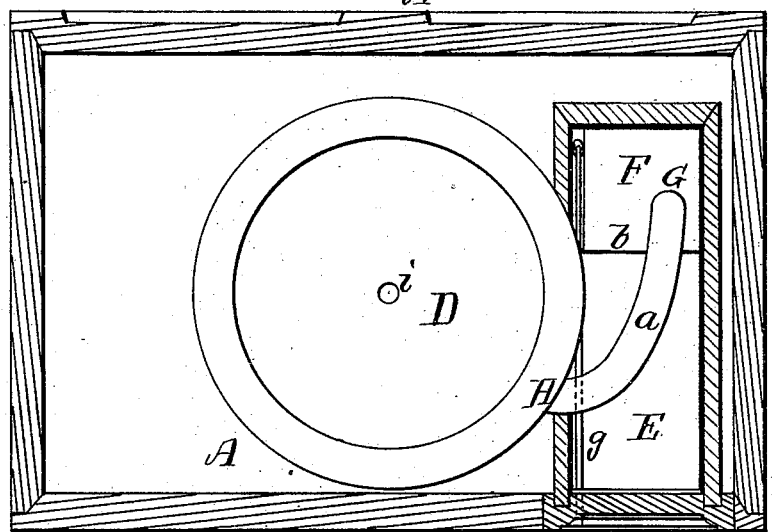
Figure 2:
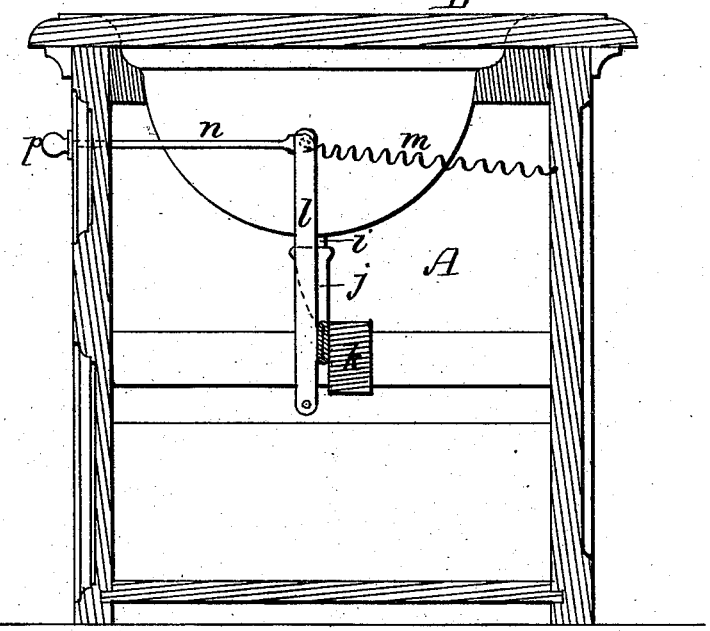
Figure 3:
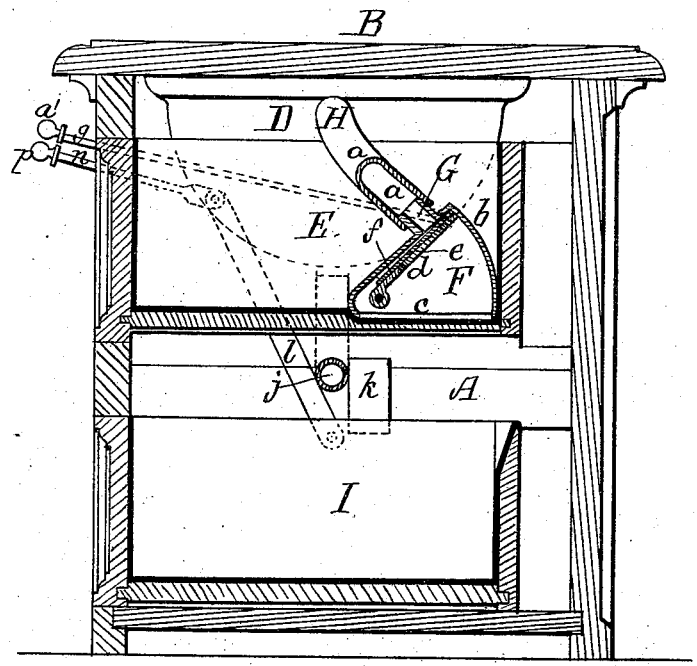
Figure 4:
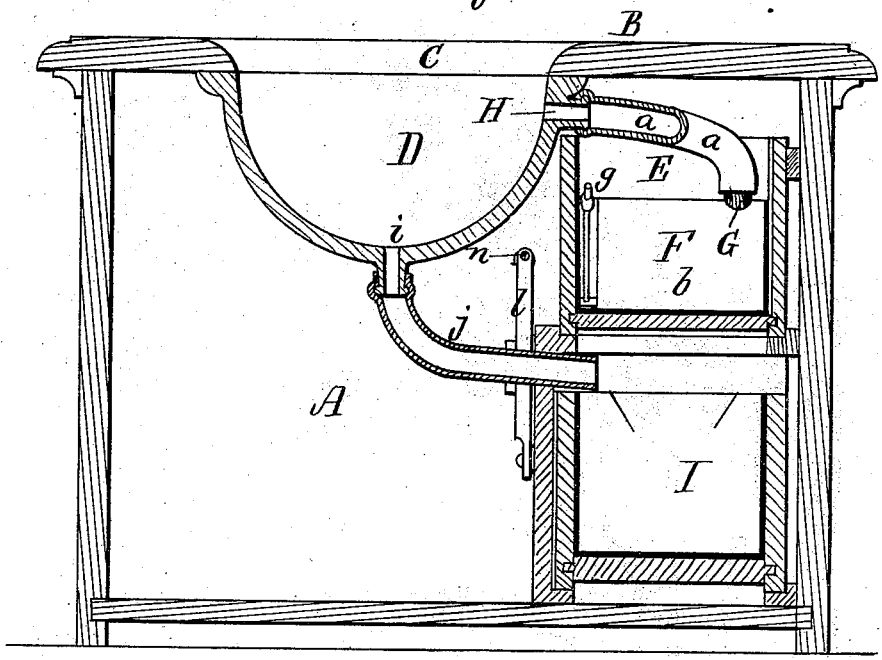

The drawings accompanying this specification represent, in Figure 1, a plan, and in Figs. 2, 3, and 4 vertical sections, of a wash-stand embodying my invention.

In these drawings, A represents the case of a wash-stand as composed of a suitable upright frame covered by a top, B, of marble or other material, having an opening, C, to permit of access to the wash-bowl D below, this bowl being permanently secured in place in the upper part of the structure, and the space below it being occupied by drawers or otherwise disposed of.

In carrying out my invention I prefer, for convenience in use and for other reasons, to arrange the fresh and waste water tanks in the form of drawers, and in the accompanying drawings I have so represented them.

The fresh-water tank is a drawer, E, disposed within the upper part of the structure, to one side of the bowl, and composed, preferably, of wood lined with metal, the front of the drawer being of a character to assimilate with the rest of the cabinet and disguise the purposes to which it is put. In the rear part of this drawer E, I place a pump, F, of any suitable construction, and I connect the discharge-outlet G of this pump with the inlet-orifice H of the bowl by a flexible tube, $a$, which permits the drawer to be opened to a sufficient extent to fill it with water without disturbing its connection with the bowl. The pump F, in the present instance, is simply a case, $b$, triangular, or approximating thereto, in cross-section, arranged within the rear end of the drawer, and having an orifice, $c$, at bottom, to permit of entrance of water from such drawer, and a flat gate, $d$, of an area equal to the surface area of the case, this gate having an orifice, $e$, covered by a clapper-valve, $f$, upon its under or outer side, and the whole so arranged that by means of a rod, $g$, pivoted to the gate outside of the drawer or tank E, the user is enabled to pump water from such tank to the bowl through the elastic pipe $a$, the said rod extending through the front of the cabinet, and being provided with a knob, $a'$, by which it may be readily operated.

As the drawer E becomes exhausted of water it may be partially opened and replenished without disturbing its relations with the bowl, and when closed the purpose to which it is put cannot, of course, be detected.

The waste-water receiver is a second drawer, I, arranged below the first, and for economy of construction, combined with durability of use, I prefer to make this drawer of wood lined with thin copper or other sheet metal not corrodible by water, though it may be entirely of sheet metal of thicker gage. This receiver I is to be provided with a bail, by which it may, after being removed from the cabinet, be carried, after the manner of an ordinary water-pail, to be emptied of its contents, and one end of it may be formed into a spout or nose, if desirable, to facilitate such emptying of its contents.

The bowl D has a central outlet, $i$, at bottom, and with this outlet I connect one end of a flexible tube, $j$, the other end of which terminates at a point over the receiver or drawer I, this pipe serving, when unobstructed, to convey waste water from the bowl to the drawer.

To provide an economical, durable, and very effective means of closing the outlet of the bowl until it is desired to empty the latter of its contents, I pass the tube $j$ between a gate or clamp composed of a stationary block or abutment, $k$, on one side, and a vertical vibrating bar, $l$, upon the other, the bar being pivoted at bottom to a stationary part of the cabinet, and so arranged with respect to the abutment as, when in its rearward position, to close up to the abutment and gripe the pipe between them with sufficient pressure to effectually close the latter and prevent escape of water from the bowl. The arm or lever $l$ is retracted by a suitable spring, $m$, connected to its upper end and to an adjacent part of the cabinet, and to force this lever forward and leave the pipe unobstructed to permit of escape of the contents of the bowl through it into the receiver I, I employ a rod, $n$, the inner end of which is pivoted to the top of the lever, and the outer end of which protrudes through the front of the cabinet, and is provided with a knob, $p$, by which it may be pulled forward against the stress of its spring. I do not confine myself to this lever and abutment as a means of choking the tube $j$, as various other means may be employed to effect such a result without involving invention.

In the use of my device, which resembles an ordinary wash-stand, or may be made to represent an ornamental piece of cabinet-work, the drawer or vessel E is to be first supplied with clean water, and the vessel or receiver I emptied of its contents, unless it be but partially full.

To supply the bowl with fresh water, the user pulls the knob $a'$ outward one or more times, according to the quantity of water desired, thus operating the pump and forcing water from the tank E to the bowl. After use of the bowl the knob $p$ is pulled, which relieves the tube $j$ of the pressure upon it and permits of escape through it to the receiver I of the contents of the bowl. This alternate supplying and emptying of the bowl is, or may be, continued until the fresh water in the tank E has passed into the receiver I, when the latter is to be emptied and returned to place and the former replenished.

By the employment of the flexible pipe as an outlet to the bowl, I am enabled to secure economy in first cost, and if the pipe becomes soiled it may be readily removed and cleaned and returned to place; or a new one may be substituted at trifling cost, while by the employment of the lever $l$, operating with a stationary abutment, as explained, I provide a simple means, not only of preventing escape of contents of the bowl until the proper time, but of sealing the outlet-pipe against escape through the bowl of disagreeable odors from the receiver I, should any exist in the latter.

To prevent spilling of the contents of the drawers or tanks E I as they are withdrawn or inserted, the upper edge of the lining of each may be extended inward toward the center in a curved overhanging direction, and one or both may be provided with a hinged cover, covering the whole or a portion of its top.

I claim as my invention, and desire to secure by Letters Patent of the United States, the following:

1. A portable wash-stand consisting of the following elements: first, a suitable case or cabinet containing at its upper part a stationary wash-bowl; second, a tank or vessel for containing a supply of clean water, arranged to be readily accessible for the purpose of replenishing its contents, and provided with a pump, which is operated from the outside of the structure and connected to the inlet-port of the bowl by a flexible tube, which permits of the movement of the tank necessary to renew its contents; and, lastly, a vessel or tank for receiving the waste water discharged from the bowl and connected with the outlet of such bowl by a flexible tube, and the combination, with this latter tube, of a device for choking it, to prevent escape of the contents of the bowl or passage of injurious or disagreeable odors, the whole operating substantially as explained.

2. In a portable wash-stand containing a stationary bowl, a fresh-water supply-tank or waste-water receiver, or both, in the form of drawers, the first being adapted to be partially withdrawn to be refilled, and supplying its contents to the bowl by an inseparable elastic tube, and the latter arranged to be removed entirely, and constituting a pail, which may be carried as such to empty it of its contents, all substantially as explained.

3. In a portable wash-stand containing a stationary bowl, a fresh-water tank containing a force-pump, by which to transfer its contents to the bowl, and an elastic tube connecting the outlet of its pump with the inlet of the bowl, to permit of movement of the tank without interrupting its connection with the bowl, substantially as explained.

In testimony whereof I affix my signature in presence of two witnesses.

NATHAN O. BOND.

Witnesses:
FREDERICK CURTIS,
H. A. CURTIS.